United States Patent
Ramachandran et al.

(10) Patent No.: US 11,061,708 B2
(45) Date of Patent: Jul. 13, 2021

(54) SYSTEM AND METHOD FOR HYPERVISOR AGNOSTIC SERVICES

(71) Applicant: Nutanix, Inc., San Jose, CA (US)

(72) Inventors: Partha Ramachandran, San Jose, CA (US); Ritesh Rekhi, San Jose, CA (US); Srini Ramasubramanian, San Jose, CA (US); Gregory A. Smith, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/105,866

(22) Filed: Aug. 20, 2018

(65) Prior Publication Data
US 2020/0057667 A1 Feb. 20, 2020

(51) Int. Cl.
G06F 9/455 (2018.01)
H04L 12/931 (2013.01)

(52) U.S. Cl.
CPC .......... *G06F 9/45558* (2013.01); *H04L 49/70* (2013.01); *G06F 2009/45595* (2013.01)

(58) Field of Classification Search
CPC ....... G06F 9/45558; G06F 2009/45595; H04L 49/70
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,874,749 B1* | 10/2014 | Vittal | G06F 9/5077 709/226 |
| 9,471,590 B2* | 10/2016 | Venkatesh | G06F 3/0641 |
| 9,772,866 B1 | 9/2017 | Aron et al. | |
| 10,091,100 B1* | 10/2018 | Duerk | H04L 47/24 |
| 2002/0035624 A1* | 3/2002 | Kim | H04L 29/12066 709/222 |
| 2008/0155169 A1* | 6/2008 | Hiltgen | G06F 9/45558 711/6 |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Emerson C Puente
*Assistant Examiner* — Jonathan R Labud
(74) *Attorney, Agent, or Firm* — Foley & Lardner LLP

(57) ABSTRACT

A system and method can include requesting, by a network agent in a virtual machine in a hypervisor-attached infrastructure, a first identifier of a first resource device. The method can include comparing the first identifier to a plurality of known identifiers. The method can include determining a first location of the first resource device in response to matching the first identifier to one of the plurality of known identifiers. The method can include requesting a second identifier of a second resource device. The method can include determining a second location of the second resource device in response to the second identifier being different from each of the plurality of known identifiers. The second location can be different than the first location.

17 Claims, 7 Drawing Sheets

(56) References Cited

U.S. PATENT DOCUMENTS

| | | | | |
|---|---|---|---|---|
| 2011/0246986 A1* | 10/2011 | Nicholas | ............ | G06F 11/0712 718/1 |
| 2012/0254553 A1* | 10/2012 | Myrah | ................ | H04L 67/1097 711/154 |
| 2013/0166504 A1* | 6/2013 | Varkhedi | ............... | G06F 16/275 707/610 |
| 2014/0003232 A1* | 1/2014 | Guichard | ............ | H04L 67/1029 370/230 |
| 2014/0156818 A1* | 6/2014 | Hunt | .................. | H04L 63/0407 709/222 |
| 2015/0234611 A1* | 8/2015 | Mutalik | .............. | G06F 11/1446 711/114 |
| 2019/0294582 A1* | 9/2019 | Zhu | ........................ | G06F 3/065 |

OTHER PUBLICATIONS

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Cano, Ignacio, et al. "Curator: Self-Managing Storage for Enterprise Clusters" (Mar. 27, 2017) from https://www.usenix.org/conference/nsdi17/.

* cited by examiner

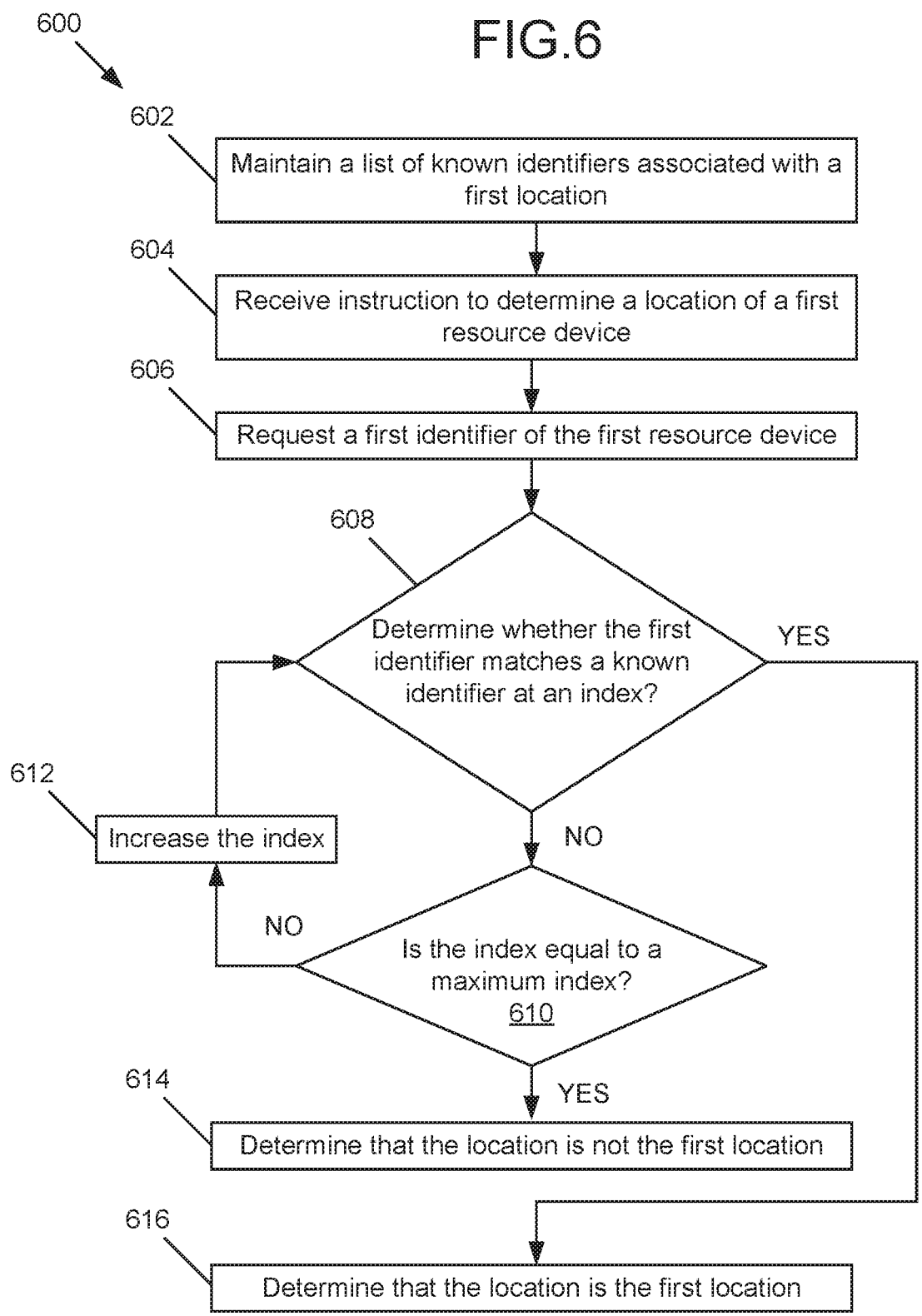

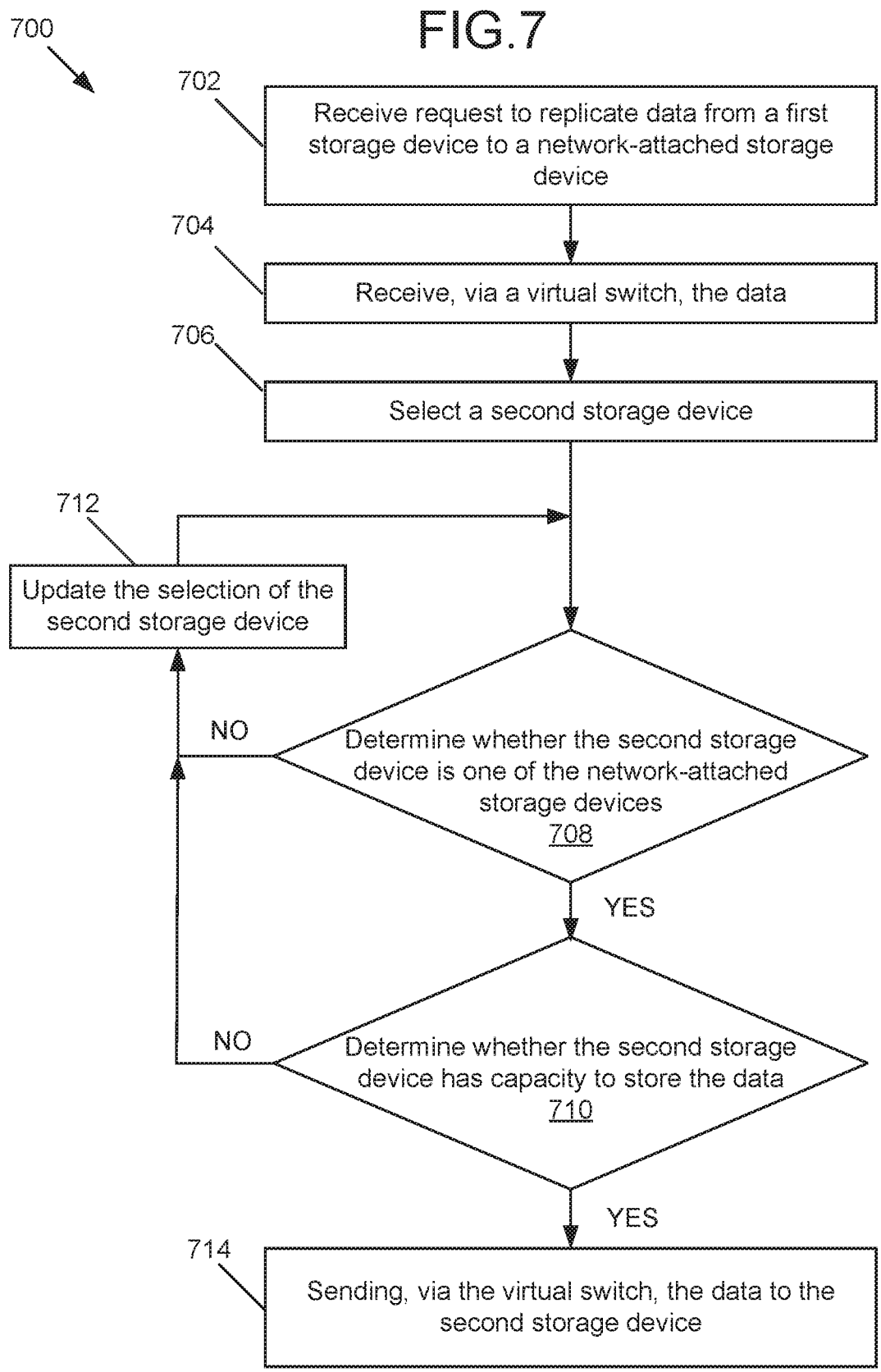

SYSTEM AND METHOD FOR HYPERVISOR AGNOSTIC SERVICES

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

In accordance with some aspects of the present disclosure, a method is disclosed. The method can include requesting, by a network agent in a virtual machine in a hypervisor-attached infrastructure, a first identifier of a first resource device. The method can include comparing the first identifier to a plurality of known identifiers. The method can include determining a first location of the first resource device in response to matching the first identifier to one of the plurality of known identifiers. The method can include requesting a second identifier of a second resource device. The method can include determining a second location of the second resource device in response to the second identifier being different from each of the plurality of known identifiers. The second location can be different than the first location.

In accordance with some other aspects of the present disclosure, a system is disclosed. The system can include a hypervisor-attached infrastructure including a virtual machine including a network agent. The network agent can be configured to request a first identifier of a first resource device. The network agent can be configured to compare the first identifier to a plurality of known identifiers. The network agent can be configured to determine a first location of the first resource device in response to matching the first identifier to one of the plurality of known identifiers. The network agent can be configured to request a second identifier of a second resource device. The network agent can be configured to determine a second location of the second resource device in response to the second identifier being different from each of the plurality of known identifiers. The second location can be different than the first location.

In accordance with yet other aspects of the present disclosure, a non-transitory computer readable media with computer-executable instructions embodied thereon is disclosed. The instructions when executed by a processor of a network agent associated with a virtual computing system cause the network agent to perform a process. The process can include requesting a first identifier of a first resource device. The process can include comparing the first identifier to a plurality of known identifiers. The process can include determining a first location of the first resource device in response to matching the first identifier to one of the plurality of known identifiers. The process can include requesting a second identifier of a second resource device. The process can include determining a second location of the second resource device in response to the second identifier being different from each of the plurality of known identifiers. The second location can be different than the first location.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 6 is an example flowchart of a discovery process for discovering locations of resource devices, in accordance with some embodiments of the present disclosure.

FIG. 7 is an example flowchart of a replication process for replicating data in storage devices, in accordance with some embodiments of the present disclosure.

Figure 1:
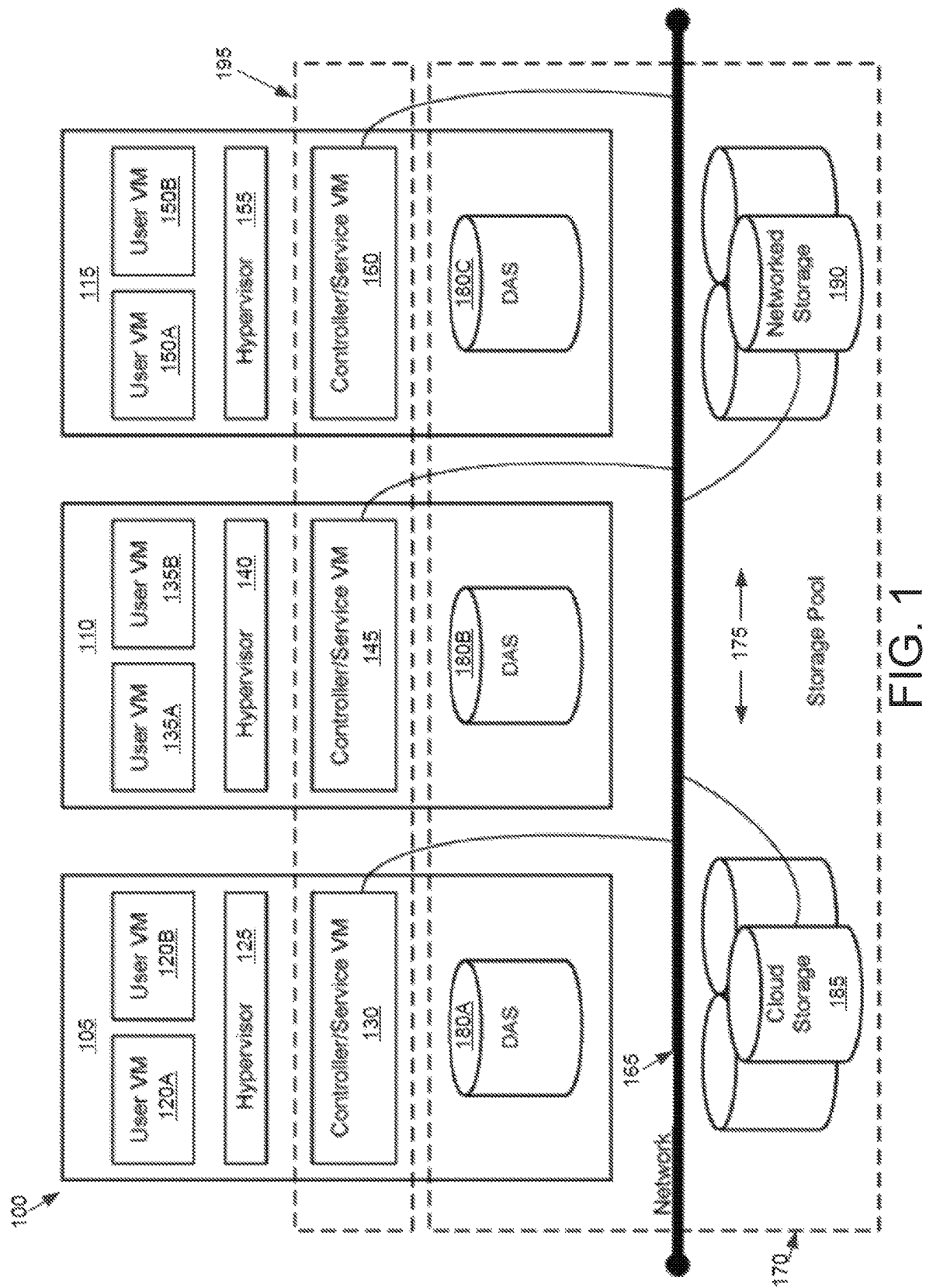
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

On-premises datacenters and off-premises clouds provide compute and storage resources for clients in need of storing data. Clients connecting to datacenters can control the security configuration and customize the datacenter based on client-specific applications and workloads. Datacenters can utilize hypervisor-attached storage including a hypervisor interface that provides a tight coupling between compute and storage resources and reduces latency. Clouds are more scalable and cost-effective because the cloud-provider is responsible for maintaining and managing the equipment. The cloud can use network-attached-storage including network protocols such as Transmission Control Protocol/Internet Protocol (TCP/IP) and storage protocols such as Small Computer System Interface (SCSI), enabling sharing of resources in a multi-tenant cloud environment.

In embodiments not utilized by this disclosure, a guest virtual machine launched on the client device in the on-premises data center only communicates using hypervisor application programming interfaces (APIs) to access the on-premises compute and storage resources. The hypervisor APIs of the associated guest virtual machine are not exposed to the multi-tenant cloud, thus limiting the flexibility of the datacenter. Thus, a technical problem exists, wherein the guest virtual machine on the on-premises data-center is incapable of accessing a storage resource on the remote cloud. What is needed is a system that provides the benefits of the on-premises datacenters and the remote cloud.

The present disclosure addresses the technical problem by disclosing a hypervisor-agnostic interface that exposes the datacenter compute and storage resources through network protocol and network endpoints. As used herein "hypervisor-agnostic interface" is an interface between resources in the datacenter and resources in the cloud that can operate regardless of the type of hypervisor solution present in the datacenter. One implementation of the "hypervisor-agnostic interface" can be a virtual switch and a controller virtual machine including a network agent.

Embodiments in the present disclosure open the door for new hypervisor-agnostic services, such as a resource location discovery process, a datacenter-to-cloud replication service, and an address translation service. The present disclosure is technically advantageous because a guest virtual machine can exploit the inherent advantages of the data center and the cloud. Another advantage is that the client device in the datacenter can make decisions based on information detected in or corresponding to the cloud. Yet another advantage is that the client device can comply with storage policy rules by storing a portion of or a copy of the data on the cloud.

In some aspects, systems and methods for hypervisor-agnostic services are described. The systems and methods can include requesting, by a network agent in a virtual machine in a hypervisor-attached infrastructure, a first identifier of a first resource device, and comparing the first identifier to a plurality of known identifiers. The systems and methods can include determining a first location of the first resource device in response to matching the first identifier to one of the plurality of known identifiers. The systems and methods can include requesting a second identifier of a second resource device. The systems and methods can include determining a second location of the second resource device in response to the second identifier being different from each of the plurality of known identifiers. The second location can be different than the first location.

Virtual Computing System

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 (referred to herein as "controller VM 130") configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 is accessible via the network 165 and, in some embodiments, may include cloud storage 185, as well as local storage area network 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure. Some additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system (e.g., Prism Element from Nutanix, Inc.) configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Hypervisor-Agnostic System

Figure 2A:
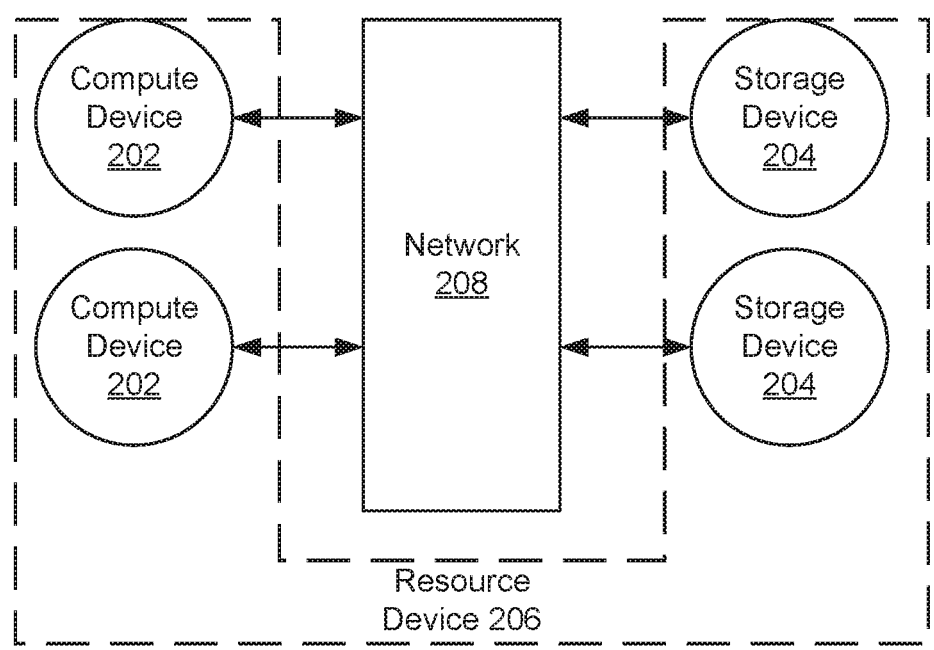
FIG. 2A is a block level diagram of network-attached storage, in accordance with some embodiments of the present disclosure.

FIG. 2A is a block level diagram of network-attached storage system 200, in accordance with some embodiments of the present disclosure. The network-attached storage system 200 includes one or more compute devices 202, one or more storage devices 204, and a network 208 coupled to the one or more compute devices 202 and the one or more storage devices 204. Although two compute devices 202 and two storage devices 204 are shown, in other embodiments, greater than or fewer than two compute devices 202 and two storage devices 204 may be used. The one or more compute devices 202 and the one or more storage devices 204 may be collectively referred to as one or more resource devices 206.

The network-attached storage system 200 may be configured to allocate portions of the one or more storage devices 204 into individual file systems. The network-attached storage system 200 may be in a provider-owned cloud infrastructure in an on-premises data center. The network-attached storage system 200 in the provider-owned cloud infrastructure may be partitioned into a provider-owned portion and one or more tenant-owned portions. In some embodiments, the provider and the one or more tenants comply with restrictive authoritative domain rules.

The one or more resource devices 206 may communicate using Transmission Control Protocol/Internet Protocol (TCP/IP), file system protocols, e.g. Network File System (NFS) and Server Message Block (SMB), and/or storage transfer protocols, e.g. Small Computer Systems Interface (SCSI). Each of the resource devices 206 may be a hardware resource. The compute device 202 may the one or more processing units described in accordance with FIG. 1. The compute device 202 may be one or more servers. The storage device 204 may be a device in the network-attached storage 175 (e.g., the cloud storage 185, the local storage area network 190, etc.).

Figure 2B:
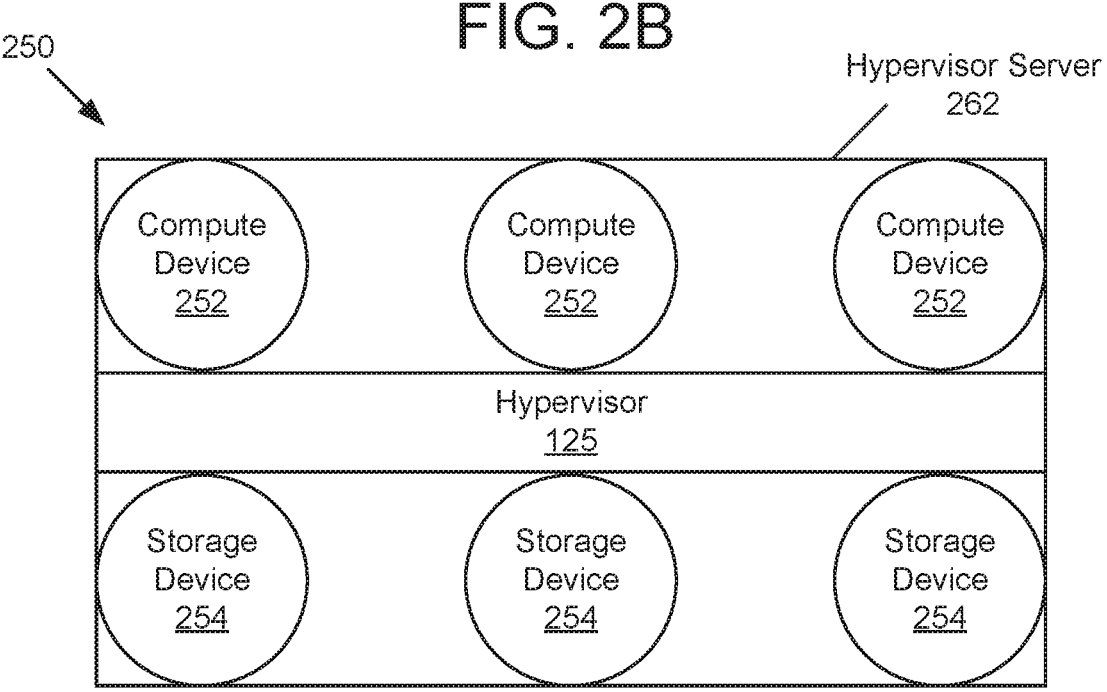
FIG. 2B is a block level diagram of hypervisor-attached storage, in accordance with some embodiments of the present disclosure.

FIG. 2B is a block level diagram of hypervisor-attached storage system 250, in accordance with some embodiments of the present disclosure. The hypervisor-attached storage system 250 may be implemented same as network-attached storage 200 except that the hypervisor-attached storage system 250 includes a hypervisor 125 coupled to the one or more compute devices 252 and the one or more storage devices 254. In some embodiments, the compute devices 252 and the storage devices 254 are same as the compute devices 202 and the storage devices 204, respectively. The one or more compute devices 252 and the one or more storage devices 254 may be collectively referred to as one or more resource devices 256. The one or more resource devices 256, and the hypervisor 125 may be included in a hypervisor server 262. The hypervisor server 262 may be hardware (e.g. a box). The hypervisor-attached storage system 250 may be configured to run virtualization software, as described in accordance with FIG. 1. The one or more compute devices 252 may communicate with the one or more storage devices 254 using hypervisor-specific protocols (e.g. VMCI from VMWare). The hypervisor-attached storage system 250 may be in an on-premises data center.

Figure 3:
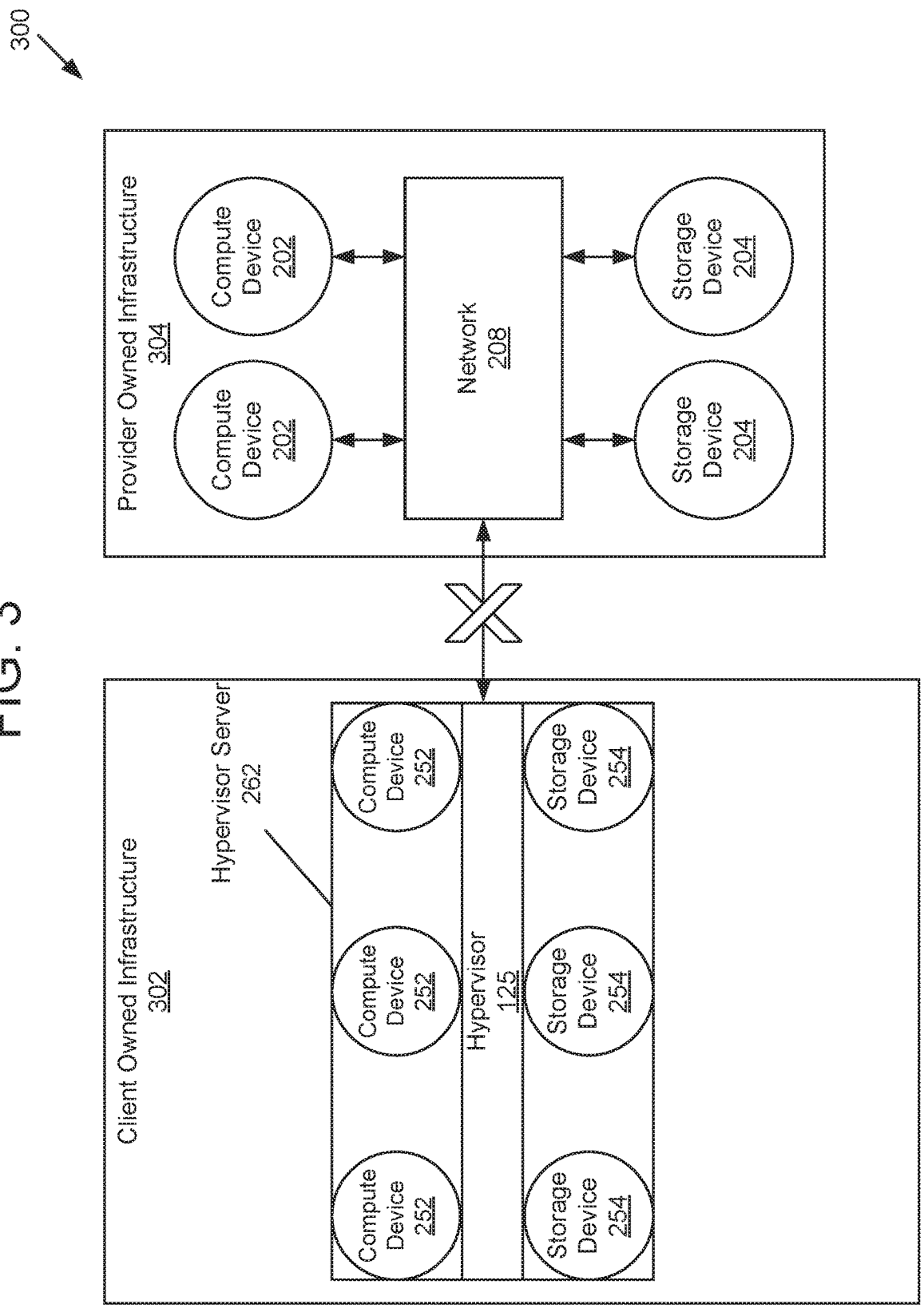
FIG. 3 is a block level diagram of a computing environment not utilized by the present disclosure.

FIG. 3 is a block level diagram of a computing environment 300 not utilized by the present disclosure. The computing environment 300 includes a client-owned infrastructure 302 including the hypervisor-attached storage system 250. The computing environment 300 also includes a provider-owned infrastructure 304 including a network-attached storage system 200. The one or more resource devices 256 in the client-owned infrastructure 302 does not have capability to communicate with the one or more resource devices 206 in the provider-owned infrastructure 304.

Figure 4:
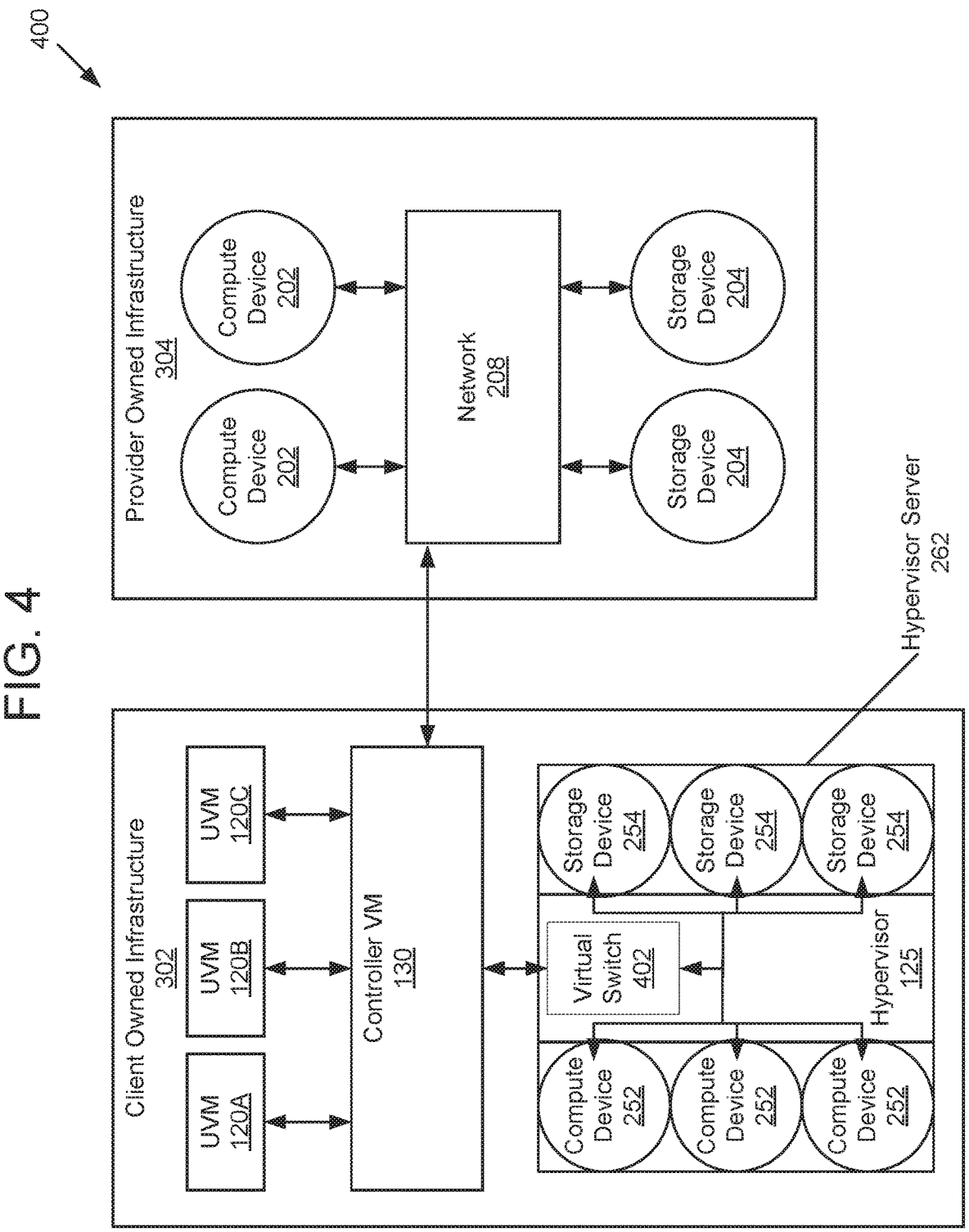
FIG. 4 is an example block diagram of a hypervisor-agnostic environment, in accordance with some embodiments of the present disclosure.

FIG. 4 is an example block diagram of a hypervisor-agnostic environment 400, in accordance with some embodiments of the present disclosure. The hypervisor-agnostic environment 400 includes a client-owned infrastructure 302 including the virtual computing system 100. The virtual computing system includes the UVMs 120, the hypervisor server 262 of the hypervisor-attached storage system 250 (e.g. the hypervisor server 262), and the controller VM 130 coupled to the UVMs 120 and the hypervisor-attached storage system 250. The hypervisor-agnostic environment 400 also includes a provider-owned infrastructure 304 including a network-attached storage system 200. The controller VM 130 and the network 208 are communicatively coupled. Although only one network-attached storage system 200 and one hypervisor-attached storage system 250 is shown in FIG. 4, the hypervisor-agnostic environment 400 can include greater than or fewer than one network-attached storage system 200 and one hypervisor-attached storage system 250.

The hypervisor server 262 includes the hypervisor 125. The hypervisor 125 is shown to include a virtual switch 402, the resource devices 256. The virtual switch 402 is coupled to each of the resource devices 256 located in the hypervisor server 262. The virtual switch 402 is configured to expose compute and storage through network protocol and network endpoints, thereby making the hypervisor server 262 look like a network-attached system 250. The virtual switch 402 may be configured to send an internet-protocol (IP) address and port corresponding to one of the resource devices 256 to the controller VM 130. The virtual switch 402 may be configured to send data associated with the resource devices 256 to the controller VM 130. The virtual switch 402 may be configured to receive data associated with the resource devices 256 from the controller VM 130. The virtual switch 402 may be controlled by access policies defined by the client, an administrator on behalf of the client, the controller VM 130, and/or one of the UVMs 120. The access policies determine whether one of the compute devices 252 in the hypervisor server 262 may access one of the storage devices 254 in the hypervisor server 262. The virtual switch 402 may use the TCP/IP protocol.

Figure 5:
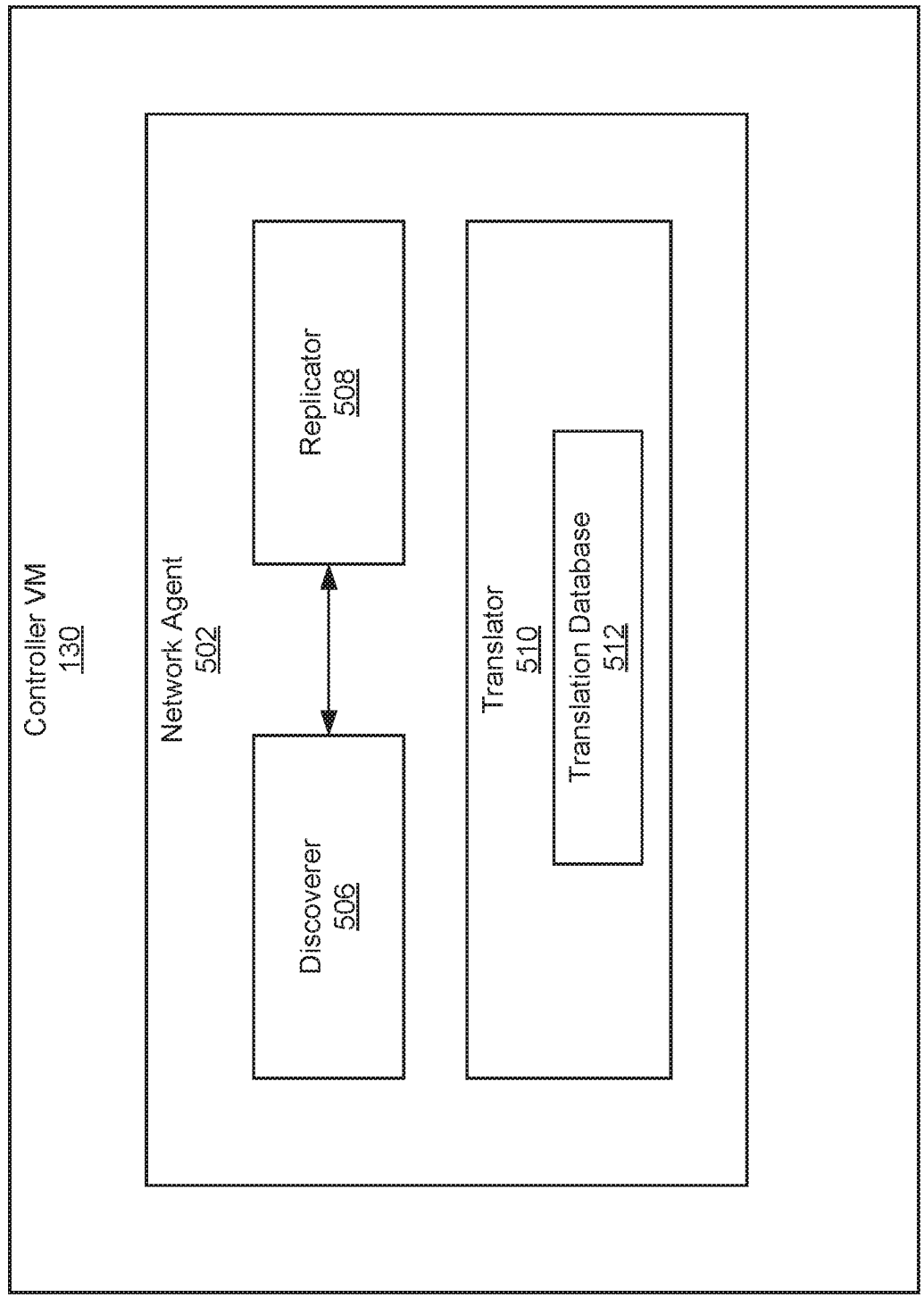
FIG. 5 is an example block diagram of a controller VM of the virtual computing system in greater detail, in accordance with some embodiments of the present disclosure.

FIG. 5 is an example block diagram of the controller VM 130 of the hypervisor-agnostic environment 400 in greater detail, in accordance with some embodiments of the present disclosure. The controller VM 130 includes a network agent 502. The network agent 502 includes a discoverer 506, a replicator 508, and a translator 510 including a translation database 512. The network agent 502 is configured to provide services at the transport layer and/or the application layer to facilitate and manage sharing of resources between the hypervisor-attached storage system 250 and the network-attached storage system 200. In some embodiments, the network agent 502 is an Internet Small Computer Systems Interface (iSCSI) agent.

The translator 510 may be coupled to the virtual switch 402. The translator 510 may include a translation database 512. The translator 510 may be configured to translate an internal facing IP address and port associated with a first resource device (e.g. the compute device 202 or the storage device 204) of the network-attached storage system 200 of the provider owned infrastructure 304 to an public IP address and port, and vice-versa. In some embodiments, the translator 510 may be configured to translate in response to receiving a location identifier for the provider owned infrastructure 304 (e.g. an availability zone) that the first resource device is located in. In some embodiments, the internal facing IP address and port may be associated with a second resource device (e.g. the compute device 252 or the storage device 254) of the hypervisor-attached storage system 250 of the client owned infrastructure 302. In some embodiments, the translator 510 may be configured to translate in response to receiving the location identifier for the client owned infrastructure 302 that the second resource device is located in. The translator 510 may be configured to receive the internal facing IP address, port, and/or availability zone of the first resource device from the virtual switch 402 or the network-attached storage system 200. The translator 510 may be configured to translate by identifying the public IP address and port at an index in the translation database 512 corresponding to the internal facing IP address, port, and/or availability zone. In some embodiments, the translation may be offloaded to the virtual switch 402.

The discoverer 506 may be configured to determine a location of one or more of the resource devices 206 or one or more of the resource devices 256. The determined location may be in the network-attached storage system 200 or in the hypervisor-attached storage system 250. In some embodiments, the discoverer 506 may be configured to determine one or more identifiers of a third resource device (e.g. the resource device 256 or the resource device 206). In some embodiments, the identifiers may be the IP address and/or port associated with the third resource device. The discoverer 506 may be configured to compare the identifiers to a group of known identifiers. The group of known identifiers may identify each of the resource devices 256 that are in the hypervisor-attached storage system 250. For example, the group of known identifiers may be determined by the hypervisor 125 and received by the discoverer 506 from the hypervisor 125 directly or via the translator 510. In response to matching the identifier to one of the group of known identifiers, the discoverer 506 may determine that the third resource device is in the hypervisor-attached storage system 250. In response to not matching the identifiers to any of the group of known identifiers, the discoverer 506 may determine that the third resource device is in the network-attached storage system 200. The discoverer 506 may use any protocol or access a registry that would provide one IP and port mapping to another port IP mapping. In some embodiments, the discoverer 506 access the translator 510 and/or the translation database 512.

The replicator 508 may be coupled to the discoverer 506. The replicator 508 may be configured to replicate data located on a first storage device (e.g. the storage device 254) in the hypervisor-attached storage system 250 to a second storage device (e.g. the storage device 204) in the network-attached storage system 200, and vice-versa. The replicator 508 may replicate the data in response to a request. The request may be generated and sent in response to inputs from a user or a change in a system configuration associated with the hypervisor-agnostic environment 400. The system configuration may in accordance with a storage policy or a disaster recovery policy. The replicator 508 may receive indication of the locations of the first storage device and the second storage device from the discoverer 506. The replicator 508 may send a memory address and an instruction to the first storage device to send the data in the memory address to a memory data register (MDR) associated with the replicator 508. In response to the instruction, the first storage device may send the data to the MDR. The replicator 508 may send a second memory address, the data, and a second instruction to the second storage device to write the data in the second memory address. In response to the second instruction, the second storage device may store the data.

According to one embodiment of the disclosure, the virtual switch 402, the discoverer 506, the replicator 508, and the translator 510 are services comprising instructions. The instructions of the services may be executed by one or more processing units associated with the network agent 502 and may be stored in memory associated with the network agent 502, the controller VM 130, or the hypervisor 125. Such instructions may be read into memory from another computer readable/usable medium, such as the storage pool 170. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware.

The term "computer readable medium" or "computer usable medium" as used herein refers to any medium that participates in providing instructions to the one or more processing units for execution. Such a medium may take many forms, including but not limited to, nonvolatile media and volatile media. Non-volatile media includes, for example, optical or magnetic disks, such as a disk drive in the storage pool 170. Volatile media includes dynamic memory, such as the memory associated with the one or more processing units. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

FIG. 6 is an example flowchart of a discovery process 600 for discovering locations of resource devices, in accordance with some embodiments of the present disclosure. The process may include additional, fewer, or different operations, depending upon the particular embodiment. At operation 602, the network agent 502 may maintain a list of known identifiers associated with a first location. In some embodiments, the first location is the hypervisor-attached storage system 250. At operation 604, the network agent 502 may receive an instruction to determine a location of a first resource device (e.g. the resource device 256 or the resource device 206). In some embodiments, the network agent 502 receives the instruction from one of the user VM 120, the controller VM 130, and/or a first compute device (e.g. the compute device 252). At operation 606, the network agent 502 may request a first identifier of the first resource device. In some embodiments the network agent 502 requests the first identifier from the hypervisor 125.

At operation 608, the network agent 502 may determine whether the first identifier matches a known identifier at an index in the list. Responsive to determining that the first identifier does not match the known identifier at the index, the network agent 502 determines whether the index is equal to a maximum index. In some implementations, the determination may be made by comparing the index to a size of the list. If the size is at least two greater than the index, then the index may not be equal to the maximum index. Responsive to determining that the index is not the maximum index, at operation 612, the network agent 502 may increase the index and return to operation 608. Responsive to determining that the index is the maximum index, then, at operation 614, the network agent 502 may determine that the location is not the first location. Responsive to determining, at operation 608, that the first identifier matches the known identifier at the index, then, at operation 616, the network agent 502 may determine that the location is the first location.

FIG. 7 is an example flowchart of a replication process 700 for replicating data in storage devices, in accordance with some embodiments of the present disclosure. The process may include additional, fewer, or different operations, depending upon the particular embodiment. At operation 702, the network agent 502 may receive a request to replicate data in a first storage device (e.g. the storage device 254) to a network-attached storage device. At operation 704, the network agent 502 may receive, via the virtual switch 402, the data. In some embodiments, the network agent 502 may store the data in a MDR associated with the network agent 502. At operation 706, the network agent 502 may select a second storage device (e.g. the storage device 204).

At operation 708, the network agent 502 may determine whether the second storage device is one of the network-attached storage devices 204. In some embodiments, the determination may be implemented, at least in part, by the discovery process 600. For example, by determining, at operation 614, that the location is not the first location, the network agent 502 can determine, by process of elimination, that the location is the network-attached storage system 200. Responsive to determining, at operation 708, that the second storage is one of the network-attached storage devices, then, at operation 710, the network agent 502 may determine whether the second storage device has capacity to store the data. Responsive to determining that the second storage has the capacity, then, at operation 714, the network agent 502 may send, via the virtual switch 402, the data to the second storage device. Responsive to either determining, at operation 708, that the second storage is not one of the network-attached storage devices, or, at operation 710, that the second storage device does not have the capacity to store the data, then, at operation 712, the network agent 502 may update the selection of the second storage device. Responsive to updating the selection of the second storage device, the network agent 502 may return to operation 708.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected," or "operably coupled," to each other to achieve the desired functionality, and any two components capable of being so associated may also be viewed as being "operably couplable," to each other to achieve the desired functionality.

Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:

receiving, by a virtual machine (VM) in a first server, a request to replicate data stored in the first server to any resource device in a second node separate from the first server;

receiving, by the VM and via a virtual switch in the first server, the data from a source resource device in the first server, wherein the virtual switch exposes the source resource device through a network protocol and a network endpoint;

receiving from a network agent in the VM a first identifier of a first resource device in the second node;

selecting, by the VM, the first resource device using the first identifier; and sending the data, by the VM and via the virtual switch, to the first resource device.

2. The method of claim 1, further comprising:

comparing the first identifier of the first resource device to a plurality of known identifiers associated with the first server; and determining that the first identifier of the first resource device is different from each of the plurality of known identifiers.

3. The method of claim 1, further comprising:

determining an internal facing internet-protocol address and port for the first resource device; and translating the internal facing internet-protocol address and port to a public internet-protocol address and port.

4. The method of claim 3, further comprising identifying the public internet-protocol address and port at an index corresponding to the internal facing internet-protocol address and port.

5. The method of claim 3, further comprising translating the internal facing internet-protocol address and port to the public internet-protocol address and port responsive to receiving an availability zone associated with the first resource device.

6. The method of claim 1, wherein the server is a hypervisor-attached infrastructure is owned by a client and the second node is part of a network-attached infrastructure is owned by a provider.

7. A first server comprising a virtual machine that:

receives a request to replicate data stored on the first server to any resource device in a second node separate from the first server;

receives, via a virtual switch in the first server, the data from a source resource device in the first server, wherein the virtual switch exposes the source resource device through a network protocol and a network endpoint;

receives from a network agent a first identifier of a first resource device in the second node;
selects the first resource device using the first identifier; and
sends, via the virtual switch, the data to the first resource device.

8. The first server of claim 7, the virtual machine:
compares the first identifier of the first resource device to a plurality of known identifiers associated with the first server; and
determines that the first identifier of the first resource device is different from each of the plurality of known identifiers.

9. The first server of claim 7, the virtual machine:
determines an internal facing internet-protocol address and port for the first resource device; and
translates the internal facing internet-protocol address and port to a public internet-protocol address and port.

10. The first server of claim 9, the virtual machine identifies the public internet-protocol address and port at an index corresponding to the internal facing internet-protocol address and port.

11. The first server of claim 9, the virtual machine translates the internal facing internet-protocol address and port to the public internet-protocol address and port responsive to receiving an availability zone associated with the first resource device.

12. The first server of claim 7, wherein the first server is a hypervisor-attached infrastructure is owned by a client and the second node is part of a network-attached infrastructure is owned by a provider.

13. A non-transitory computer-readable medium having computer-executable instructions stored thereon that, upon execution by one or more processors associated with a virtual machine in a first server, causes the virtual machine to perform operations comprising:
receiving a request to replicate data stored on the first server to any resource device in a second node separate from the first server;
receiving the data from a source resource device in the first server;
receiving from a network agent a first identifier of a first resource device in the second node;
selecting the first resource device using the first identifier; and
sending the data to the first resource device.

14. The non-transitory computer-readable medium of claim 13, the operations further comprising:
comparing the first identifier of the first resource device to a plurality of known identifiers associated with the first server; and
determining that the first identifier of the first resource device is different from each of the plurality of known identifiers.

15. The non-transitory computer-readable medium of claim 13, the operations further comprising:
determining an internal facing internet-protocol address and port for the first resource device; and
translating the internal facing internet-protocol address and port to a public internet-protocol address and port.

16. The non-transitory computer-readable medium of claim 15, further comprising translating the internal facing internet-protocol address and port to the public internet-protocol address and port responsive to receiving an availability zone associated with the first resource device.

17. The non-transitory computer-readable medium of claim 13, wherein the first server is a hypervisor-attached infrastructure is owned by a client and the second node is part of a network-attached infrastructure is owned by a provider.

* * * * *